(12) United States Patent
Lee

(10) Patent No.: US 7,338,276 B2
(45) Date of Patent: Mar. 4, 2008

(54) MOLD TOOL FOR PAPER RELIEF ENGRAVING

(76) Inventor: Chia-Shun Lee, No. 361-1, Dongyong Street, Bade, Taoyuan County (TW) 334

(*) Notice: Subject to any disclaimer, the term of this patent is extended or adjusted under 35 U.S.C. 154(b) by 307 days.

(21) Appl. No.: 11/149,853

(22) Filed: Jun. 10, 2005

(65) Prior Publication Data

US 2006/0280830 A1    Dec. 14, 2006

(30) Foreign Application Priority Data

Feb. 3, 2005 (TW) .............................. 94202026 U

(51) Int. Cl.
*B29C 59/02* (2006.01)

(52) U.S. Cl. ............... 425/385; 425/390; 425/394; 425/398; 425/411; 101/382.1

(58) Field of Classification Search ............. 425/385, 425/390, 394, 398, 408, 411, DIG. 57; 101/382.1, 101/28, 383; 216/9, 40, 52
See application file for complete search history.

(56) References Cited

U.S. PATENT DOCUMENTS 3,669,019 A * 6/1972 Barouh et al. ............. 101/470
5,181,464 A * 1/1993 Kuhlman et al. ............. 101/28
6,582,614 B2 * 6/2003 Hutchison et al. ........... 101/486

FOREIGN PATENT DOCUMENTS

| GB | 534371 | * | 3/1941 |
| GB | 747773 | * | 4/1956 |
| GB | 816284 | * | 7/1959 |

* cited by examiner

*Primary Examiner*—Yogendra N. Gupta
*Assistant Examiner*—Thu Khanh T. Nguyen
(74) *Attorney, Agent, or Firm*—Alan Kamrath; Kamrath & Associates PA

(57) ABSTRACT

A mold tool for paper relief engraving provides a mold cavity, a mold plunger and a folder for being detachably fixed with the mold cavity and the mold plunger at the inner sides thereof. The mold cavity and the mold plunger are doubly etched to create pattern nests and pattern projections respectively with smooth fine contours and edges such that the relief engraved paper can be tightly pressed in a way of the flat part of the paper being kept without wrinkles and deformation at the nests and the jut up part of the paper extending sufficiently. Hence, the relief engraved configuration presents outstanding sense of beauty especially for making a greeting card.

8 Claims, 3 Drawing Sheets

FIG 1
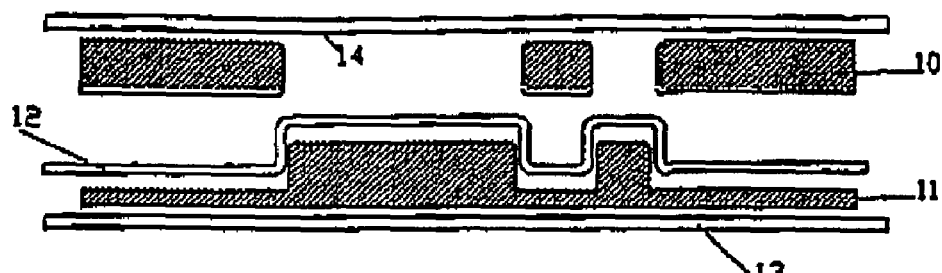
FIG 2
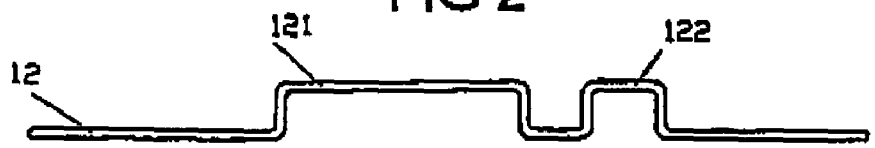
FIG 3 (PRIOR ART)
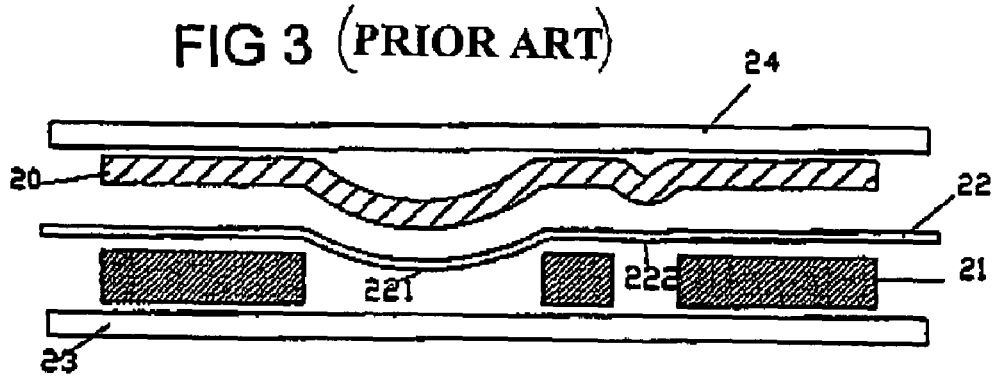
FIG 4 (PRIOR ART)
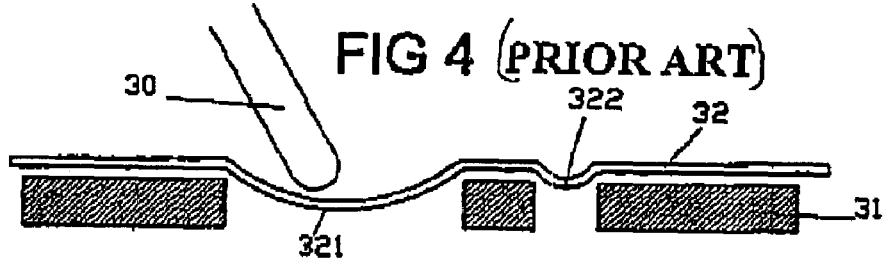
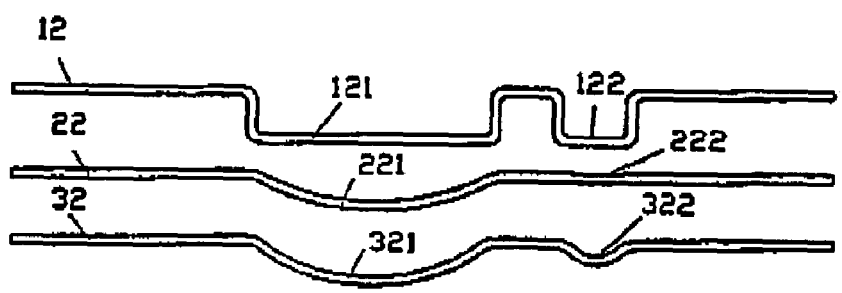
FIG 5

FIG 6
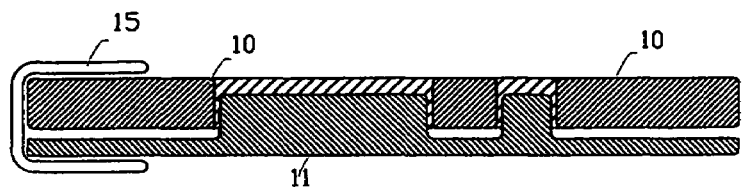
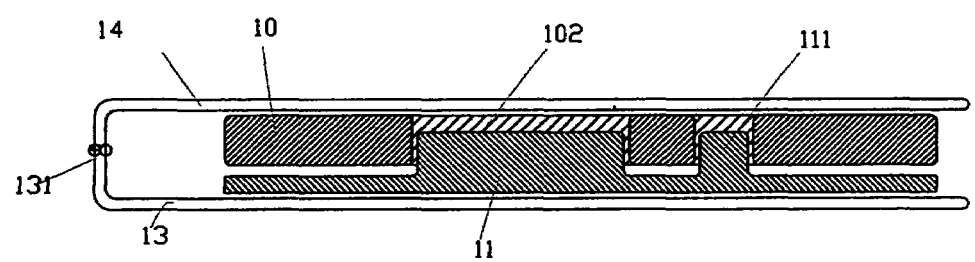
FIG 7
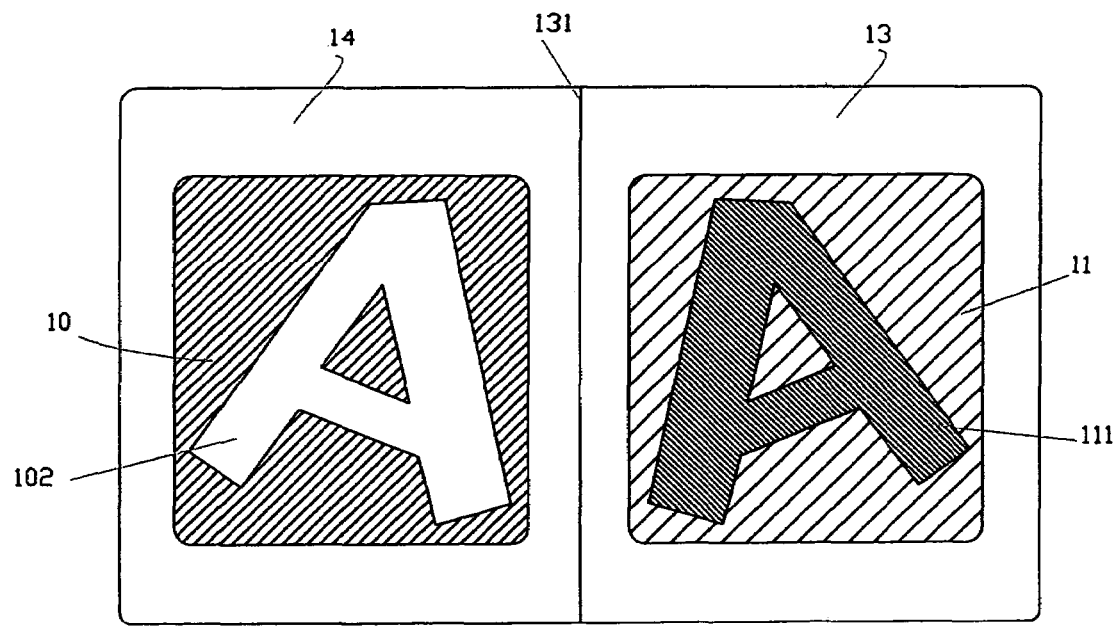
FIG 8

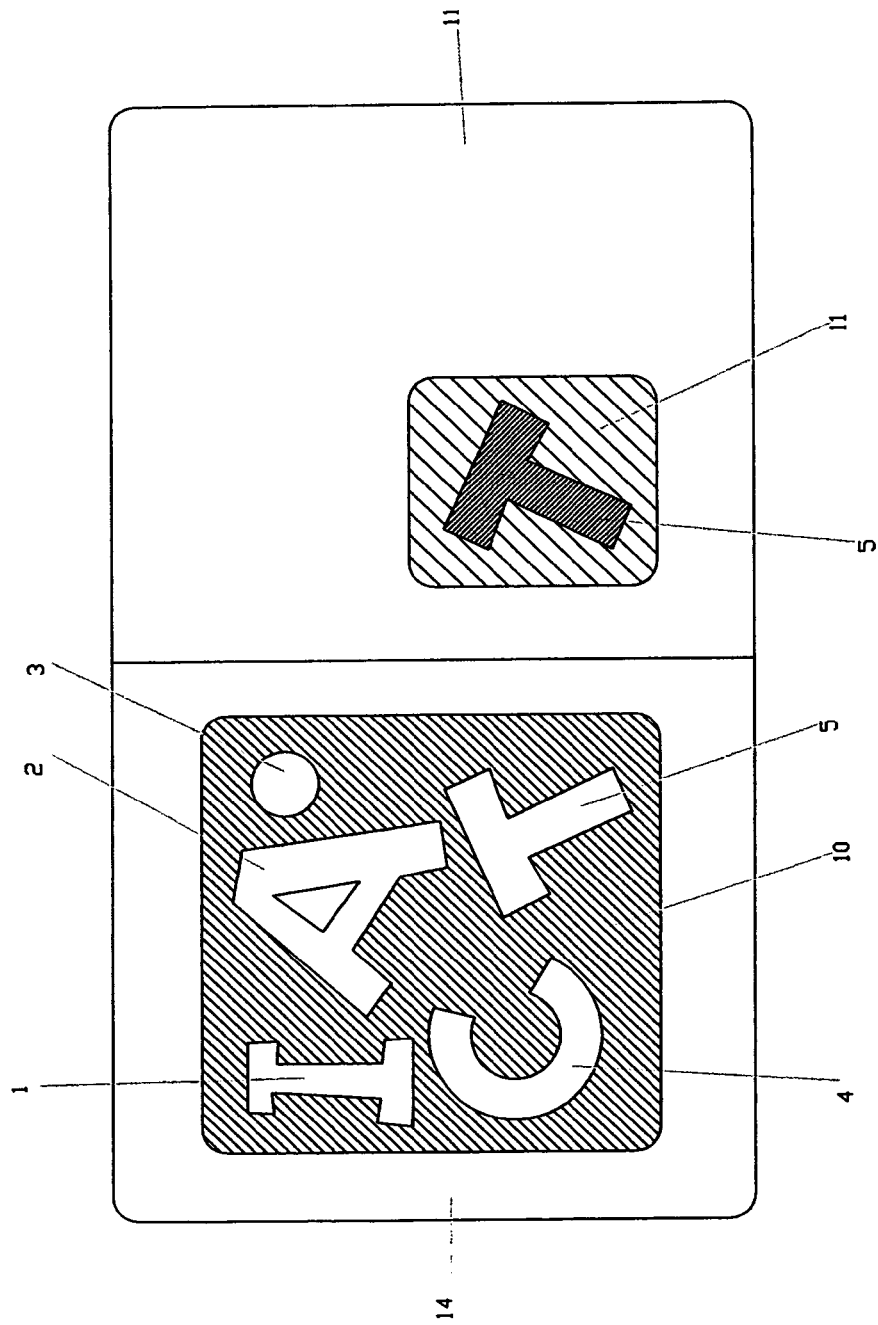

MOLD TOOL FOR PAPER RELIEF ENGRAVING

FIELD OF THE INVENTION

The present invention relates to a plastic molding tool for hand-made paper relief engraving, more particularly to a mold tool for paper relief engraving applied to card or other hand-made paper work making.

BACKGROUND OF THE INVENTION

Due to paper being capable of being turned, folded, jutted, nested, bent, cut and rubbed, the traditional way for making relief engraved paper is done by hand easily to form desirable patterns. Because different color papers have been turned, folded and bent properly in advance, the patterns made can present three-dimensional configuration to enhance effect of sense of beauty. Except skillful hands and creative brain, tools for making the relief engraved paper are articles at hand in our daily life such as scissors, pen knife, art work knife, rolling stick and hard paper tubes. Hence, cut lines, uphill lines and downhill lines can be formed with scissors, pen knifes or art work knife. Concave upward shapes and concave downward shapes are made with rolling sticks and the hard paper tubes are used for padding. Other tools such as cut boards, compasses, compass knifes rulers, pens, mirrors, spray glues, resins, double sided glue tapes are required for making relief engraved paper. The cut lines, uphill lines (front light cut lines) and downhill lines (back cut lines) can be used to allow the paper jutting up or nesting down so as to create a sense of beauty. The basic principle of the traditional way is that the cutters cut the paper fibers and the rolling sticks extend the paper fibers. However, it takes time and labor hours in spite of having a little natural pleasure from hand making and quality of the relief engraved paper varies in terms of skillfulness of the maker. Thus, the relief engraved works with insufficient hand is not only impossible to show beauty of relief engaging but also is easy to result in wrinkles.

In order to overcome the preceding problems, a further method is illustrated in FIG. 3. A metal plate is stamped as a middle mold cavity 21 with relief patterns on and a plastic plate mold 20 is formed with thermal pressing using the middle mold cavity 21 to correspond to the middle mold cavity 21. The plastic plate mold 20, which is a male mold, is pressed against the middle mold cavity 21, which is a female mold, to produce a paper with relief engraved patterns on a paper. The method shown in FIG. 3 has advantages such as fast, no skillful problem and being simply made. However, the plastic mold 20 provides flatten projections and the relief part 222 of the paper 22 becomes much more flat such that it is unable to show a configuration of three-dimension conspicuously and present the relief patterns correctly.

Referring to FIG. 4, a relief engraving copper plate 31 is widely adopted as the mold cavity currently. The way for performing plastic molding is in that a relief engraving rod 30 with a round head is placed above the relief engraving copper plate 31 to press a paper ready for being plastically molded such that the paper produces deformations 321, 322 along nests of the relief engraving copper 31. Because the relief engraving rod 30 is made of hard material in addition to manual pressing force, the exerting force is easy to be controlled and damages and scares resulting from sharp nest rims can be avoided easily although the relief engraving way needs more effort and takes time. Comparing to the plastic plate, which is a mold plunger, shown in FIG. 3, the pressing rod shown in FIG. 4, which is used instead of a mold plunger, is easier to be fabricated and it is noting to do with problems created during fitting with the mold cavity. It can be seen that the relief engraved paper 32 in FIG. 4 looks better than the relief engraved paper 22 shown in FIG. 3.

In fact, the rim of each nest of the mold cavity is a key subject has to be considered. The stamped mold cavity having burrs is an inevitable problem and the burrs have to be removed by way of grinding. The mold cavity fabricated with etching provides irregular wave shaped nest rims, which have to be worked too in addition to sharp edges of the nests. Therefore, the conventional mold cavity is very difficult to be constituted as a module with the mold plunger and the delicate patterns on the conventional mold cavity is unable to be reached in addition to difficult plastic molding, ineffective plastic molding and high production cost.

SUMMARY OF THE INVENTION

Accordingly, the primary objective of the present invention is to provide a mold tool for paper relief engraving in which the metal mold cavity and the metal mold plunger are made with double etching technique provide a feature of non-deformation and pressing force transmission, so that the paper, which is disposed between the mold cavity and the mold plunger, is kept off sliding and squeezed in a limited space to form a contour of the mold plunger.

It is noted that the double etching can obtain fine etched nest and the rims of the nest has a tiny chamfer to prevent the paper from damaged or broken. Hence, when the paper extends during being squeezed, smoothness can be reached with the largest tension. Although it is common in the field of metal sheet pressing and stamping, it is very hard in the field of hand made art.

The thin plate type mold cavity and mold plunger set allows that the relief engraved paper having the projection part and the flat part thereof being looked conspicuously different from each other with clear edges in between. In this way, the plate type mold cavity and the mold plunger can be detachably fixed to a folder such that a folder type mold tool can be formed and the procedure of mold alignment is capable of being waived completely for simplifying operation of the mold tool.

The secondary objective of the present invention is to provide a mold tool for paper relief engraving in which a base behind the mold cavity is transparent or even no base is provided such that the locations of relief engraved patterns and situation of plastic molding can be observed completely and any hand operated pressing tool such as hand press, hydraulic press, pen stick or push rod can be used for shaping the paper in the process of making the relief engraved patterns.

The third objective of the present invention is to provide a mold tool for paper relief engraving with which operation of paper relief engraving can be performed more easily and safely without the need of skill especially comparing to the traditional tools such as art work knife and pen knife or using the mold cavities with sharp rims.

BRIEF DESCRIPTION OF THE DRAWINGS

The above objects and advantages of the present invention will become more apparent with reference to the appended drawings wherein:

FIG. 1 is a side view illustrating a mold cavity, a mold plunger and a plastic molded paper and a complete relief engraved paper respectively according to the present invention in which the mold plunger and the mold cavity are shown with sectional view;

FIG. 2 is a side view of the relief engraved paper shown in FIG. 1;

FIG. 3 is a sectional view of the conventional mold plunger made with a plastic sheet;

FIG. 4 is a sectional view of the conventional mold cavity illustrating another way of making relief engraved paper being made with the conventional mold cavity;

FIG. 5 is a side view illustrating the relief engraved paper of the present invention and the other two conventional relief engraved papers.

FIG. 6 is a sectional view illustrating an embodiment of the mold tool for paper relief engraving;

FIG. 7 is a sectional view illustrating another embodiment of the mold tool for paper relief engraving;

FIG. 8 is a plan view illustrating the mold tool; and

FIG. 9 is a plan view illustrating more extensive application of the mold tool for paper relief engraving.

DETAILED DESCRIPTION OF THE INVENTION

Referring to FIGS. 1, 6 and 7, a mold cavity 10 of a relief engraving mold tool is made with double etching and has at least a pattern nest 102 with smooth nest rim. The mold plunger 11 of the relief engraving mold tool is made with double etching too and has at least a pattern projection 101 with smooth edges. The mold plunger 11 provides a height slightly less than the mold cavity 10 so that there is a clearance between the mold plunger 11 and the mold cavity 10 when both of them are joined to each other during making a relief engraving paper.

Referring to FIGS. 6 and 7 again, once the mold cavity 10 fit with the mold plunger 11, a wide glue tape 15 can be used to hold outer sides of the mold cavity 10 and the mold plunger 11 at a lateral sides thereof as shown in FIG. 6 or the outer sides of the mold cavity 10 and the mold plunger 11 are adhered to inner sides 13 and 14 of a folder with glue as shown in FIG. 7 respectively. In this way, a paper can be kept pressed to constitute a specific form between the mold cavity 10 and the mold plunger 11 while the mold cavity 10 and the mold plunger 11 are kept joined to each other a period of time.

The most significant advantage of the relief engraving mold tool with wide glue tape 15 is that it is not necessary to use the folder so that it is not necessary to spend cost and space for the folder. Hence, it is suitable for the relief engraved patterns being disposed at the margin of the paper and it is not necessary to reserve too much space for making the relief engraved paper. For the relief engraved patterns being disposed away from the margins of the paper, the folder with inner sides 13 and 14 shown in FIG. 7 is much better than the wide glue tape 15 because more space is available for margins of the paper to extend forward.

Referring to FIG. 8 in company with FIG. 7, it can be seen the mold cavity 10 is at the left side of the folding line 131 and the mold plunger 11 is at the right side of the folding line 131 once the folder shown in FIG. 7 is opened. The nest 102 of the mold cavity 10 is corresponding to the projection 111 of the mold plunger 11.

A further advantage of the present invention is in that in case of the mold plunger corresponding a nest in the mold cavity, the mold plunger and the mold cavity constitute a mold tool in spite of what size and thickness of the frame of the mold cavity having. Once the mold plunger fits with the mold cavity, the back sides thereof are adhered with double side glue tape for being attached to the inner sides of the folder, a relief engraving mold tool is completed.

Referring to FIG. 9, the mold cavity 10 are provided with pattern nests 1, 2, 3, 4 and 5 but the mold plunger 11 only has a pattern projection 5 in addition to the mold cavity 10 having a different size from the mold plunger 11. It is noted that although only the projection 5 in the mold plunger 11 corresponds to the nest in the mold cavity 10, a set of new relief engraving mold tool can be completed once back sides of both the mold cavity 10 and the mold plunger 11 are adhered with small pieces of a double side glue tape or coated with a little glue paste to be attached to the folder.

It is appreciated that the greatest advantage of the present invention is to allow the mold plunger 11, which corresponds to the mold cavity 10 completely, presses the paper accurately without taking too much care and the purpose of plastic mold forming can be reached substantially. Further, it is very easy to perform plastic molding as long as the mold cavity 10 and the mold plunger 11 maintain corresponds to each other and in a state of being firmly positioned.

Another advantage of the present invention is in that one mold cavity can fit with different mold plungers as long as each of the mold plungers can find a corresponding nest. The paper only complies with the mold plungers so as to be formed specific patterns and it is no thing to do with how many nests in the mold cavity. The advantage makes the relief engraving mold tool being more flexible and makes the cost economical.

A further advantage of the present invention is in that in case of the mold plunger corresponding a nest in the mold cavity, the mold plunger and the mold cavity constitute a mold tool in spite of what size and thickness of the frame of the mold cavity having. Once the mold plunger fits with the mold cavity, the back sides thereof are adhered with double side glue tape for being attached to the inner sides of the folder, a relief engraving mold tool is completed.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mold tool for paper relief engraving, comprising:
   a metal mold cavity, providing at least a relief engraving nest, which is formed by way of double etching with smooth nest rim;
   a metal mold plunger, providing at least a relief engraving pattern projection, which is formed by way of double etching too with a metal mold substrate being removed part of thickness thereof and a plurality of smooth fine edges on the projection; and
   a transparent folder, the metal mold plunger and the mold cavity being readily attached to and detachable from the transparent folder;
   wherein, the mold cavity fits with the mold plunger with the relief engraving nest corresponding to and receiving the relief engraving projection, back sides of the mold cavity and the mold plunger being adhesively and pressingly attached to an inner side of the folder.

2. The mold tool for paper relief engraving according to claim 1, wherein the mold cavity and the mold plunger are double etched to have smooth fine contours so that a relief engraved paper is incapable of being scared during a plastic molding process.

3. The mold tool for paper relief engraving according to claim 1, wherein said folder is adhesively attached with part of the mold cavity and the mold plunger or entire the mold cavity and the mold plunger.

4. The mold tool for paper relief engraving according to claim 1, wherein said mold cavity has more nests except the nest corresponding to the projection of the mold plunger.

5. The mold tool for paper relief engraving according to claim 1, wherein the mold cavity and the mold plunger are detachably fixed to an inside face of the folder so as to be relocated for constituting a new mold tool, the folder being pivotable to bring the mold cavity and mold plunger toward and away from one another.

6. The mold for paper relief engraving according to claim 1, wherein a substrate is positionable between die metal mold cavity and the metal mold plunger to receive the relief engraving pattern without using heat.

7. The mold for paper relief engraving according to claim 1, wherein a substrate is positionable between the metal mold cavity and the metal mold plunger to receive the relief engraving pattern by only using pressure.

8. The mold for paper relief engraving according to claim 1, wherein the mold cavity includes different sections which are individually detachable from the transparent folder to thereby change the relief engraving pattern.

* * * * *